(12) United States Patent
Pitts

(10) Patent No.: US 6,237,282 B1
(45) Date of Patent: May 29, 2001

(54) TRELLIS SYSTEM AND LATCH MECHANISM FOR USE IN GROWING VINE PLANTS

(76) Inventor: Gary R. Pitts, 5025 E. Adams Ave., Fowler, CA (US) 93625

(*) Notice: Subject to any disclaimer, the term of this patent is extended or adjusted under 35 U.S.C. 154(b) by 0 days.

(21) Appl. No.: 09/271,409

(22) Filed: Mar. 17, 1999

(51) Int. Cl.[7] .................................................. A01G 17/06
(52) U.S. Cl. ............................. 47/46; 47/47; 248/224.8; 24/563
(58) Field of Search ................................. 47/47, 46, 48, 47/41.01; 24/570, 563, 71.1; 248/224.8

(56) References Cited

U.S. PATENT DOCUMENTS

| | | | |
|---|---|---|---|
| 304,718 | * | 9/1884 | Ford . |
| 1,543,957 | * | 6/1925 | Steiner . |
| 4,971,282 | * | 11/1990 | Dickinson ............................ 47/47 X |
| 5,337,514 | * | 8/1994 | Hiyama et al. ........................... 47/44 |
| 5,411,561 | * | 5/1995 | Conley ................................. 47/44 X |
| 5,533,239 | * | 7/1996 | Gall ........................................ 24/339 |
| 5,557,883 | * | 9/1996 | Walker ................................ 47/47 X |
| 5,575,046 | * | 11/1996 | Rourke ................................... 24/563 |
| 5,711,109 | * | 1/1998 | Pitts ..................................... 47/46 X |
| 5,797,214 | * | 8/1998 | Parrish et al. ......................... 47/47 X |
| 5,913,477 | * | 6/1999 | Dean ................................... 47/47 X |

* cited by examiner

Primary Examiner—Peter M. Poon
Assistant Examiner—Son T. Nguyen
(74) Attorney, Agent, or Firm—Richard A. Ryan

(57) ABSTRACT

A trellis system and latch mechanism for use in growing vine plants, such as grapes, raisins and the like that is particularly suited for use with the alternate bearing method of raising such plants. The latch mechanism has a latch body that pivotally connects a support arm from one row of supports to the support arm of an adjacent row of supports. Alternatively, the latch mechanism connects a wire member on one row of supports to a wire member on an adjacent row of supports. The latch body is configured to allow the user to connect to a support arm or wire member on an adjacent row of support members on the non-bearing, renewal row to support the weight of vines and fruit that comprise the bearing row. Use of the latch mechanism allows the grower to selectively open or close the trellis system to establish the bearing or renewal rows during alternate growing seasons. Use of the latch mechanism on the renewal row allows the bearing row to be left open, which improves sunshine and air flow and results in a more productive and improved quality crop.

20 Claims, 4 Drawing Sheets

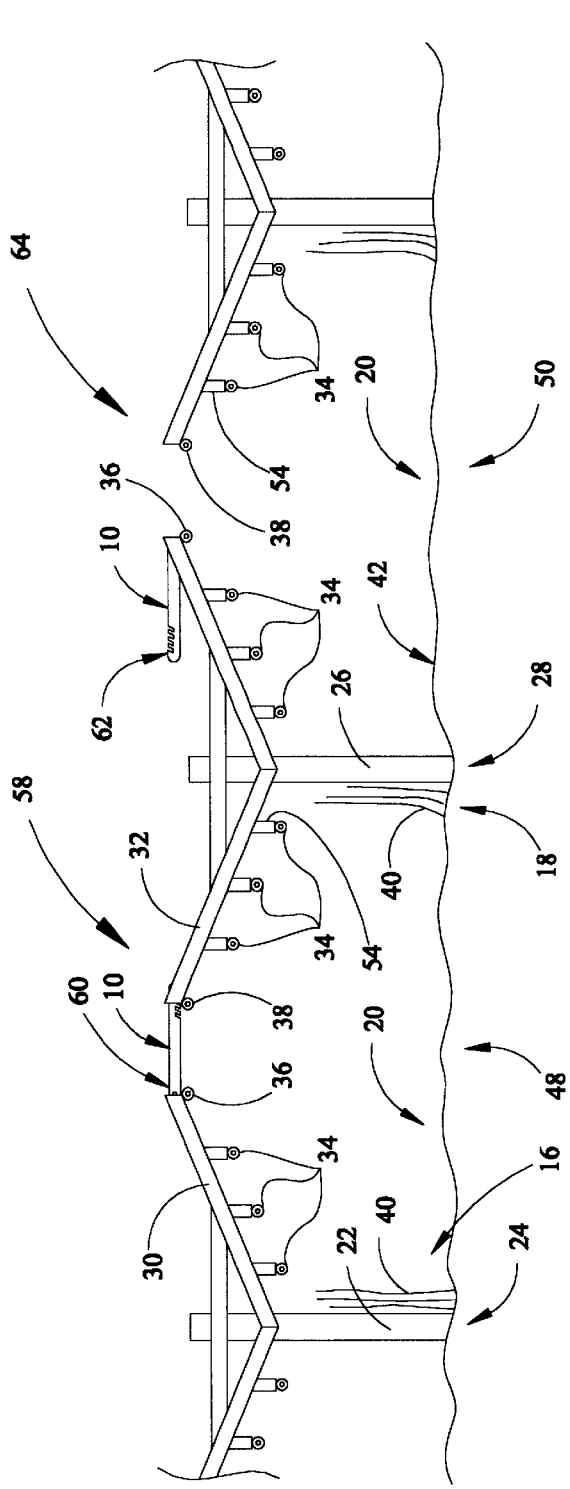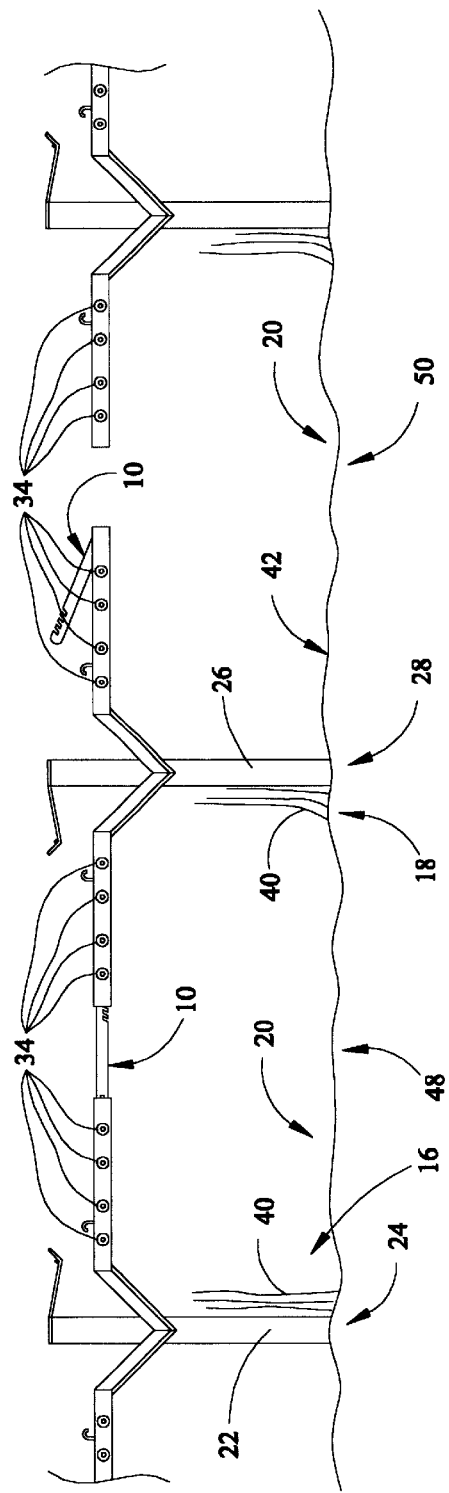

TRELLIS SYSTEM AND LATCH MECHANISM FOR USE IN GROWING VINE PLANTS

BACKGROUND OF THE INVENTION

1. Field of the Invention

The field of the present invention relates generally to trellis systems for growing vine plants. More particularly, the present invention relates to a latch mechanism for selectively opening or closing trellis systems used to grow vine plants. Even more particularly, the present invention relates to such a mechanism used to support the trellis system for growing vine plants, such as grapes and raisins, by the alternate bearing method of raising such plants.

2. Background

Successful farming operations to grow crops on a commercial basis requires the application of modern horticultural practices. These horticultural practices address the specific requirements and peculiarities of each crop based on what is needed to obtain successful commercialization of the crop. For instance, most crops have certain growing characteristics that can be harmed or improved depending upon the horticultural practices applied by the grower. These characteristics determine how varying amounts of water, sunshine, fertilizer or inclement weather will affect the growth and productivity of the crop. Naturally, it is the goal of each grower to improve the productivity of his or her crops and to maximize crop production from year to year.

The successful commercial production of most varieties of grapes, raisins, and the like is highly influenced by the application of horticultural practices that have been developed over many years. One goal of these horticultural practices has been to reduce the random, uncontrolled growth that is natural for vine plants. Controlling the growth of vine plants such that the vines grow in a relatively restrained and uniform matter can vastly improve crop production. In particular, standard horticultural practices for large scale commercial production of vine crops generally requires vine plant growth be controlled such that the plants grow in a manner which facilitates the introduction of sun light, water and fertilizer and which permits harvesting of the crop in a method consistent with large scale farming operations.

Recently, many growers have begun using sophisticated trellis systems to control the growth of grape, raisin and other vine plants to improve crop production and reduce operating costs. Use of a well-designed trellis system for growing vine plants facilitates the application of irrigation water, fertilizers, insecticides and other grower-supplied materials. A properly installed trellis system will also admit more sunlight to the interior of the vines, which improves crop production and fruit coloration, and ease the harvest of the fruit from the vines. While many trellis systems used for growing vine crops have been successful at obtaining some of the benefits described above, most conventional trellis systems do not obtain all the benefits or to not fully obtain those benefits, particularly improved crop production.

A method of growing vine plants that has been found to be very successful at increasing crop yields is the alternate bearing method described in U.S. Pat. No. 5,711,109 by the present inventor. In summary, the alternate bearing method of growing vine crops has a plurality of vine plants placed in substantially parallel rows with a trellis structure to support and control the vine growth. The grower separates each vine plant into opposing pairs of cordons that are trained to grow along courses supported by the trellis system that are substantially aligned with the rows of plants. Canes produced from each of the four cordons are trained to extend laterally in a side-by-side relation from each cordon over the trellis system toward the center of the path between the rows of vine plants toward the canes of vines growing in the adjacent row of vine plants. Generally, the trellis systems are designed to hold the canes above the earth's surface a sufficient distance to allow workers and equipment to work in the path under the vines and fruit. Each year the path between the rows of vine plants, over which the trellis system extends and the canes are grown, are designated as either a bearing row or a renewal row. The bearing row is allowed to produce fruit from the canes while the renewal row is not (i.e, by cutting the canes), thereby having a field where every other row between the rows of plants is producing fruit. For the following year, the canes that produced fruit the previous year are cut to become the renewal row and the previous renewal row becomes the bearing row and produces fruit. Although the alternate bearing method of growing vine plants results in only one-half of each vine plant growing fruit each year, it has been found to substantially increase crop yield (i.e., typically measured in tons/acre).

To support the vine plants for the alternate bearing method of growing vines, growers generally utilize either a gable trellis system or a flat trellis system. Both types of trellis systems have particular benefits of producing and harvesting the vine plants. Whichever trellis system is used, it must be able to support the weight of the fruit and vines that are make up the bearing rows on the trellis system between every other row of vine plants. Without utilizing an overly massive and cost-prohibited trellis system, the trellis members in between the renewal and bearing rows must be interconnected to support the vines and fruit growing on the alternate bearing rows, thereby creating a trellis system that is closed between rows of vine plants.

Although the closure of the rows between the rows of vine plants is necessary to support the trellis system in the alternate bearing method of growing vine plants, it does result in some reduction in the benefits of a trellis system for vine plants. For instance, because the trellis system is closed at the center of the bearing row, it is more difficult to cut open a space between vines to allow more air and sunlight into the vine plants. It is also more difficult to utilize certain types of mechanical treating and harvesting equipment and to protect the fruit on the vines during inclement weather.

3. Related Art

A number of related art devices address trellis systems used for growing vine plants. One such patent is U.S. Pat. No. 5,711,109 (the "'109 patent") by Gary R. Pitts, the present inventor. In addition to describing the alternate bearing method of growing vines discussed above, the patent describes a trellis system that has been found to be useful for growing plants by the alternate bearing method. The trellis system of the '109 patent utilizes a series of overhead trellis wires (36) that interconnect a series of main transverse cables (35) which in turn interconnect pairs of lateral upright supports (32). Although the transverse cables of the '109 patent provide support for the trellis frames (40) for the alternate bearing method, it produces a closed system. Another such patent is U.S. Pat. No. 5,144,768 (the "'768 patent") to Hiyama, et al., which describes a form of an alternate bearing method that is shown in FIG. 2 as being open between the rows of plants. However, as noted at column 6, lines 32 through 44, the support portions (62) of the non crop bearing rows must be interconnected by wires to counterbalance the weight of the crop on the crop bearing rows. Although the crop bearing row is open, the non crop bearing row is not. The wires are presumably removed each year and moved from one row to the adjacent row, which would not be an easy task.

Each of the aforementioned patents presents an apparatus for supporting a vine plant for use with an alternate bearing method of growing such plants. However, these patents disclose and require the use of either a closed trellis system or a trellis system that requires significant amount of labor to create an open trellis for the crop bearing portion. Therefore, nothing in the prior art known to the inventor discloses an apparatus that provides the benefits of an open trellis system while being able to support the trellises for the alternate bearing method of growing crops. Consequently, a need exists for an apparatus to provide the benefits of an open trellis system that is suitable for use to support either a flat or gable trellis system when used with the alternate bearing method of growing vine plants.

SUMMARY OF THE INVENTION

The trellis system and latch mechanism of the present invention solves the problems identified above. That is to say, the present invention provides a latch mechanism that is suitable for use with flat and gable trellis systems to support vine plants grown by the alternate bearing method. The trellis system and latch mechanism of the present invention allows the various rows between the rows of vine plants to be easily and selectively opened or closed depending upon the need for access or support.

The latch mechanism of the present invention comprises a latch body having first end and an opposite second end. In the primary embodiment, the first end of the latch body is configured to pivotally attach to a first support arm that is attached to a first support member that is one of a plurality of support members that form a first row of support members. The second end of the latch body is configured to releasably connect to a second support arm that is attached to a second support member that is one of a plurality of support members that form a second row of support members that are adjacent to but spaced apart from the first row of support members. In an alternate embodiment, the first end of the latch body is configured to pivot around a first wire member that attaches to the support arms on the first row of support members and the second end of the latch body is configured to releasably connect to a second wire member that is attached to the support arms on the second row of support members.

In use, the latch mechanism effectively connects the support members in the renewal row to provide support for the vines and fruit that will significantly load the bearing row as the fruit matures. Without the latch mechanism, use of the alternate bearing method of growing vine plants requires a closed trellis system, whether flat or gabled, to support the heavy, alternate loading. Use of the latch mechanism allows the bearing rows to be left open to allow easier pruning of the vines to improve sunshine and air flow, including the use of mechanical equipment to do such cutting, and makes it easier for the grower to cover his or her vines and fruit during inclement weather.

Accordingly, the primary objective of the present invention is to provide an apparatus for improving the raising of vine plants.

It is also an important objective of the present invention to provide a trellis system for improving the large scale commercial production of crops from vine plants.

It is also an important objective of the present invention to provide a latch mechanism suitable for use with trellis systems utilized for the alternate bearing method of growing vine plants.

It is also an important objective of the present invention to provide a latch mechanism for easily and selectively opening and closing trellis systems used for growing vine plants according to the alternate bearing method.

Yet another important objective of the present invention is to provide a latch mechanism that pivotally connects to a support arm or wire member on one row of support members to selectively interconnect to a support arm or wire member on an adjacent row of support members.

The above and other objectives of the present invention will be explained in greater detail by reference to the attached figures and the description of the preferred embodiment which follows. As set forth herein, the present invention resides in the novel features of form, construction, mode of operation and combination of processes presently described and understood by the claims.

BRIEF DESCRIPTION OF THE DRAWINGS

In the drawings which illustrate the best modes presently contemplated for carrying out the present invention:

FIG. 3 is a side view of a gable trellis system utilizing the latch mechanism of the present invention;

FIG. 4 is a side view of a flat trellis system utilizing the latch mechanism of the present invention.

DETAILED DESCRIPTION OF THE PREFERRED EMBODIMENTS

Figure 1:
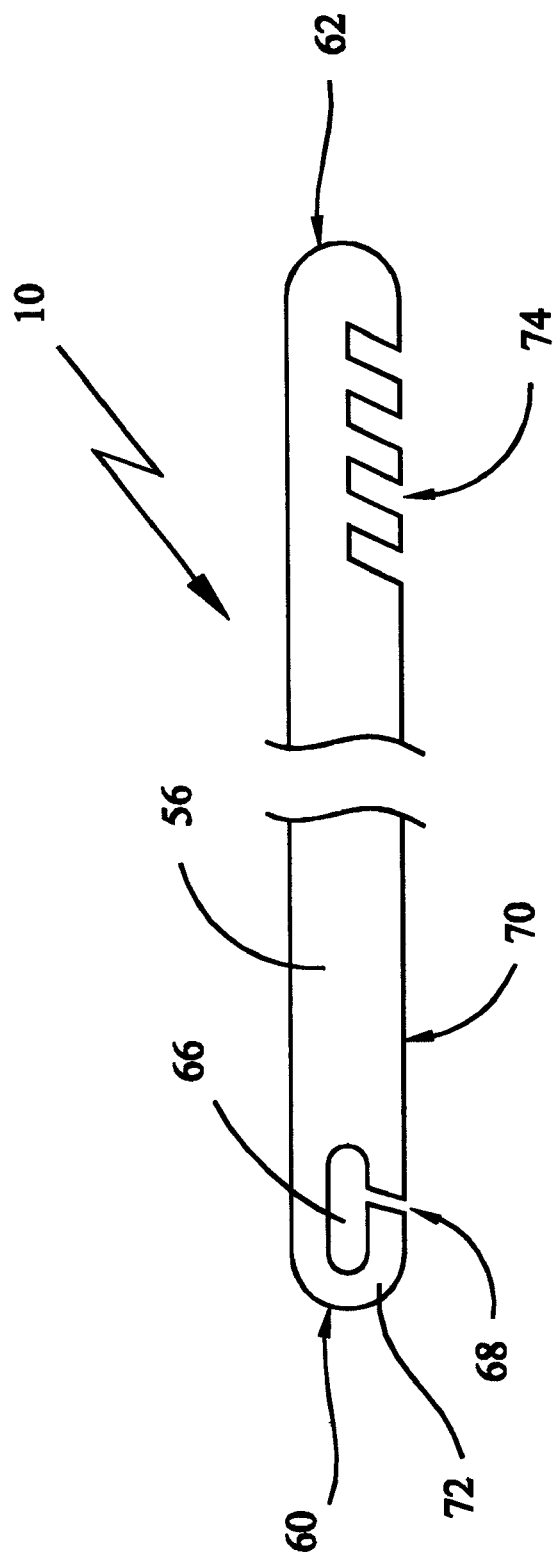
FIG. 1 is an illustration of the preferred embodiment of the latch mechanism of the present invention.
Figure 2:
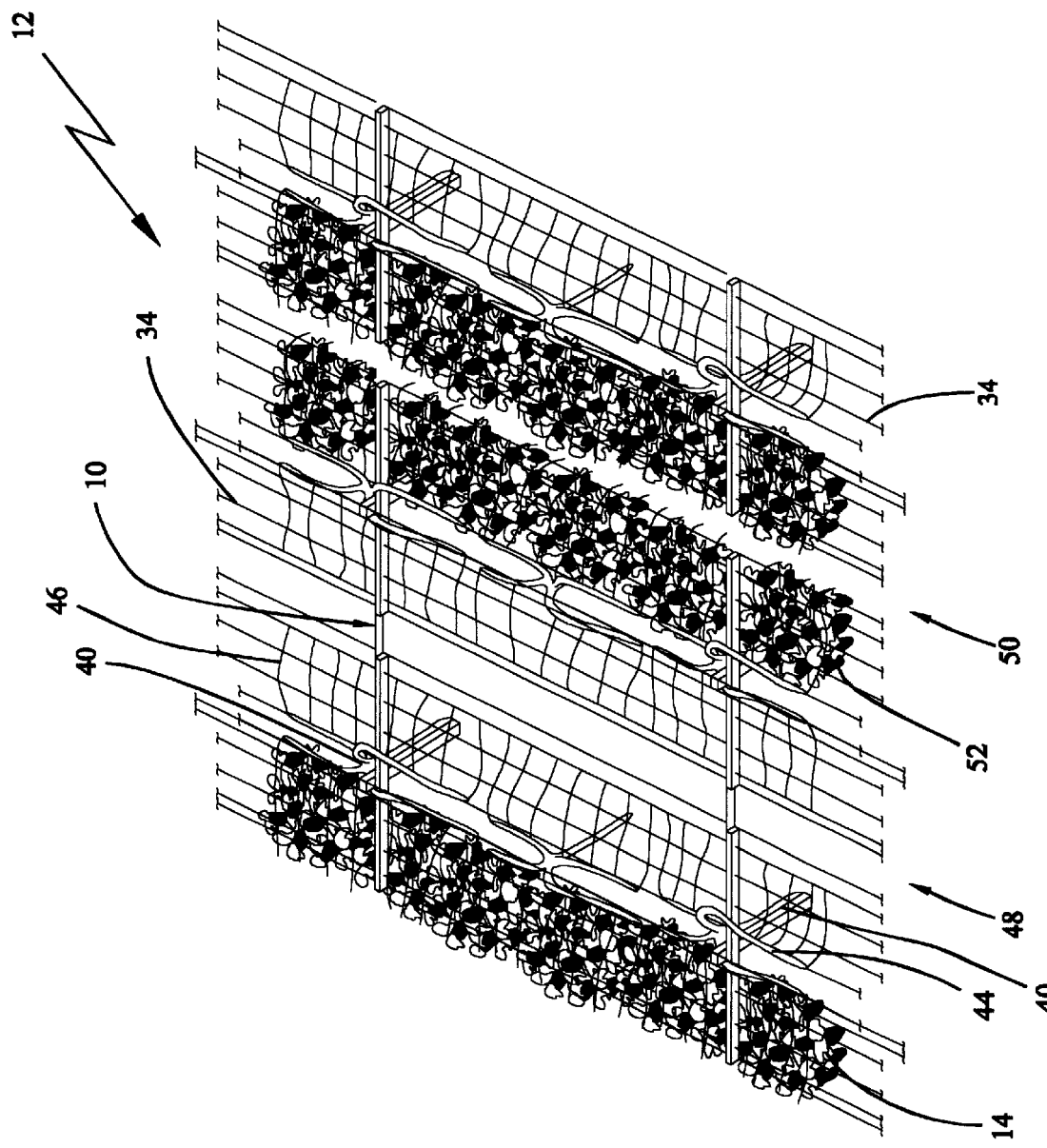
FIG. 2 is an plan view of a field of vine plants having been grown according to the alternate bearing method of raising vine plants that is using the latch mechanism of the preferred embodiment of the present invention.

With reference to the figures where like elements have been given like numerical designations to facilitate the reader's understanding of the present invention, and particularly with reference to the embodiment of the present invention illustrated in FIGS. 1 through 4, the preferred embodiment of the present invention is set forth below. The latch mechanism, designated generally as 10 and shown in detail in FIG. 1, is installed in the typical trellis system 12 used to support and control vine plants 14, such as grapes, raisins and the like, grown in a plurality of rows, as shown in FIG. 2, including first plant row 16 and second plant row 18. Second plant row 18 is in spaced apart relation and generally parallel to first plant row 16 creating path 20 between first 16 and second 18 plant rows. A typical row spacing is 12 feet, but it is not uncommon to find spacing ranging from 6 to 14 feet. As shown best in FIGS. 3 and 4, trellis system 12 utilizes a plurality of first support members 22 that are formed in a first support row 24 substantially aligned with first plant row 16. A plurality of second support members 26 form a second support row 28 substantially aligned with second plant row 18. Attached to each first support member 22 is a first support arm 30 and attached to each second support member 26 is a second support arm 32. Interconnecting the first support arms 30 on first support members 22 is a plurality of trellis wires 34, one of which is designated as first wire member 36. In the preferred embodiment the trellis wire furthest into path 20 from first support member 22 is first wire member 36. Also interconnecting the second support arms 32 on each second support member 26 is a plurality of trellis wires 34, one of which is designated as second wire member 38. In the preferred embodiment the trellis wire furthest into path 20 from second support member 26 is second wire member 38.

As illustrated in FIGS. 3 and 4, vine plants 14 have trunk 40 which is planted in ground 42 to facilitate growth of plant 14. Plant 14 is trained by pruning to form cordons 44. Although illustrated with four cordons 44, it is understood in the art that plant 14 can be trained by pruning to form any desired number of cordons. The cordons 44 are trained to follow along a path parallel to first 16 and second 18 plant rows at a position spaced above ground 42 such that a pair of cordons 44 are on each side of first 22 and second 26 support members. Canes 46 are pruned and trained to extend laterally from cordons 44 over trellis wires 34 generally toward the center of path 20. In the alternate bearing method of raising vines, one pair of cordons 44 is designated the renewal row 48 and the other is the bearing row 50. The renewal row 48 is pruned to prevent crop growth and the bearing row 50 is pruned to facilitate crop growth. The bearing row 50 will produce fruit 52 during the normal growing season of plant 14. The following year the two rows are reversed so that the path 20 between any two rows of plants will alternate between being a renewal row and a bearing row.

First 22 and second 26 support members can be made of any material suitable for use in a vineyard, such as wood, metal or various composite materials. One such material is two inch square rail steel line posts eight feet high. The height of trellis system 12 determines the height at which the bulk of fruit 52 will hang. Fruit 52 should hang at a height which is low enough for workers to reach without a stool yet high enough to allow passage of farm equipment through path 20 when fruit 52 is hanging from support arms 30 and 32. Support members 22 and 26 are mounted in ground 42 to stand in a substantially upright position. First 30 and second 32 support arms are attached generally perpendicular to first support member 22 and second support member 26, respectively. Trellis wires 34 help support first 22 and second 26 support members and provide a foundation for canes 46 from cordons 44. To assist care of plants 14 and harvesting fruit 52, one or more droppers 54 can be attached to support arms 30 and 32 to place the wire configuration at the proper elevation for the cordons 44 and first 36 and second 38 wire members. Trellis wires 34 can be made of various types of wire, including 12 gage high tensile strength galvanized wire having a tensile strength of 120,000 psi.

As is shown in FIG. 1, latch mechanism 10 is made from latch body 56, which can be made from a variety of materials, such as wood, metal or various composite materials. The size of latch mechanism 10 should provide sufficient strength for latch mechanism 10 to support the weight of fruit 52 and plants 14 on bearing row 50 when it is in the closed position 58, as discussed in more detail below. Generally, the required size of latch mechanism 10 will be dependant on the material selected for use. Latch mechanism 10 has a first end 60 and second end 62. In the preferred embodiment, first end 60 pivotally attaches to first support arm 30 to allow the grower to selectively place latch mechanism 10 in the closed position 58 or open position 64. One such pivot connection utilizes opening 66 sized and configured to connect to a pivot member (not shown) that is bolted or welded to first support arm 30 to allow latch body 56 to pivot towards and away from second support arm 32. To facilitate the installation of latch mechanism 10 on first support arm 30, a slot 68 interconnects opening 66 with the outer edge 70 of latch body 56 so the latch body portion 72 between opening 66 and edge 70 can be bent to place latch mechanism 10 on first support arm 30.

The second end 62 of latch body 56 has a mechanism for attachment to the second support arm 32 across path 20 from first support arm 30. One such attachment mechanism is the use of one or more slots 74 in latch body 56 near second end 62. The slots 74 should be sized and configured to slide over and securely connect to a connector which is bolted, welded or otherwise attached to second support arm 32. Slots 74 should be suitable for preventing latch mechanism 10 from accidently releasing from second support arm. As illustrated in FIG. 1, slots 74 can be angled in a direction opposite the direction of the pivoting travel of latch mechanism 10. The use of multiple slots allows the latch mechanism 10 to be used for different spacing between first 30 and second 32 support arms. Other connection mechanisms can be utilized to accomplish the same objectives. In addition, a locking device can be used to lock slots 74 to second support arm 32.

In the primary embodiment, latch mechanism 10 is installed on to first support member 30 by connecting it directly to first support arm 30 or by bending the body portion 72 of latch body 56 to create access to opening 66. Latch mechanism 10 is pivoted towards second support arm 32 such that slots 74 at the second end 62 of latch body 56 connect to the connector on the second support arm 32. The size and configuration of slots 74, as shown in FIG. 1, prevent latch mechanism 10 from accidently disengaging from second support arm 32. When the latch mechanism 10 is desired to be removed from second support arm 32, the grower can provide sufficient upward force to cause latch mechanism 10 to pivot toward first support arm 30.

Figure 5:
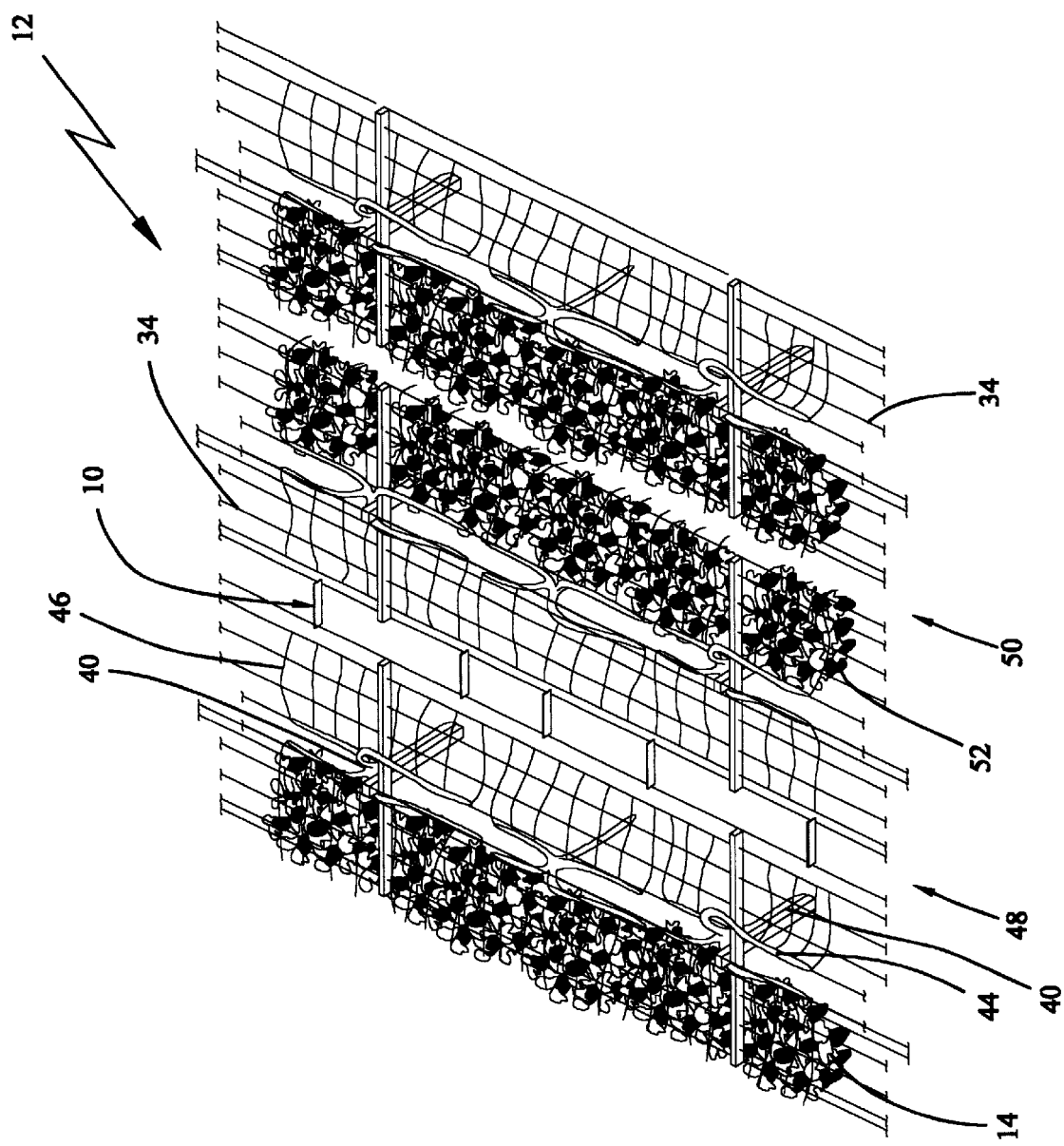
FIG. 5 is an plan view of a field of vine plants having been grown according to the alternate bearing method of raising vine plants that is using the latch mechanism of the alternate embodiment of the present invention.

In the alternative embodiment, the use of which is illustrated in FIG. 5, first end 60 pivotally attaches to first wire member 36 to allow the grower to selectively place latch mechanism 10 in the closed position 58 or open position 64. One such pivot connection, shown in FIG. 1, utilizes opening 66 sized and configured to allow latch body 56 to pivot around first wire member 36. To facilitate the installation of latch mechanism 10 on first wire member 36, a slot 68 interconnects opening 66 with the outer edge 70 of latch body 56. First wire member 36 can slide through slot 68 to opening 66 or the latch body portion 72 between opening 66 and edge 70 can be bent to place latch mechanism 10 on first wire member 36. The slots 74 at second end 62 of latch body 56 can be used to attache latch mechanism 10 to second wire member 38 across path 20 from first wire member 36. The slots 74 should be sized and configured to slide over and securely connect to second wire member 38. Slots 74 should be suitable for preventing latch mechanism 10 from accidently releasing from second wire member 38.

In use, the latch mechanism 10 of the alternate embodiment is installed on to first wire member 36 by either sliding the wire 36 through slot 68 to opening 66 so that the latch mechanism 10 will pivotally connect to first wire member 36 or by bending body portion 72 of latch body 56 to create access to opening 66 and then closed to prevent wire 36 from exiting opening 66. Latch mechanism 10 is pivoted towards second wire member 38 such that slots 74 slide over second wire member 38 and tightly engage second wire member 38. The size and configuration of slots 74, as shown in FIG. 1, prevent latch mechanism 10 from accidently disengaging from second wire member 38. When the latch mechanism 10 is desired to be removed from second wire member 38, the grower can provide sufficient upward force to cause latch mechanism 10 to pivot toward first support row 24.

Latch mechanism 10 is used in trellis system 12 to balance the crop loads that result from the alternate bearing method of growing vine plants 14, such as grapes, raisins, and the like. In any given year, the bearing row 50 will have a large quantity of vine plants 14 and fruit 52 that, at some time prior to harvesting, will significantly load trellis system 12. If a completely open trellis system 12 were used, the weight of the plants 14 and fruit 52 would cause the support members to collapse inward toward the path 20 under the bearing row 50. To prevent the collapse of the support members, the latch mechanism 10 on the renewal rows 48 are placed in the closed position 58. The weight of plants 14 and fruit 52 place latch mechanism 10 in a tensile loaded condition. During the following year, when the bearing 50 and renewal 48 rows are reversed, the open 64 or closed 58 condition of latch mechanisms 10 are also reversed.

The benefits from having a selectively open trellis system 12 are numerous and include the ability to obtain improved growth potential and fruit quality from additional sunshine. One such improvement includes the easier removal of leaves from the top canopy of vines plants 14. It is well known that significant cost savings and quality improvements can be obtained through dried-on-the-vine methods of growing and harvesting raisins. However, this procedure requires the raisin grapes to be exposed to relatively high levels of sunshine. For trellis systems 12, the current procedure is to burn the grape vines 14 over the top of path 20 to allow more sunshine in. With the latch mechanism 10 closed on the renewal row 48, a mechanical fan cutter can be used to cut away some of the vine 14 growth to obtain the improved sunshine characteristics.

Another improvement by using a open trellis system 12 for the bearing rows 50 is that the vines 14 and fruit 52 can be more easily covered during inclement weather. It is well known that rain, hail and other natural weather phenomena can significantly harm vine plants 14 or fruit 52, particularly table grapes. With an open trellis system 12, supported by latch mechanism 10, the grower can use mechanical equipment to cover the vine plants 14 and fruit 52 with plastic or other material during the period of inclement weather and remove it after the weather improves. Without the latch mechanism 10, the plants 14 and fruit 52 are generally left exposed to the elements in alternate bearing fields or the alternate bearing cannot be used, resulting in the loss of benefits from the method of growing vine plants.

Although latch mechanism 10 can be used on gable (shown in FIG. 3) or flat (shown in FIG. 4) trellis systems 12, the greatest benefits will be achieved with the gable systems, due to the general improvement of gable systems over flat systems. For instance, gable systems allow normal sized equipment to go along path 20 without having the fruit 52 hanging so high that it is difficult for field workers to reach the fruit 52 or trim the vine plants 14. The gable system is generally cheaper to install than the flat system and makes it easier to trim leaves from above and cover with a plastic covering.

While there is shown and described herein certain specific alternative forms of the invention, it will be readily apparent to those skilled in the art that the invention is not so limited, but is susceptible to various modifications and rearrangements in design and materials without departing from the spirit and scope of the invention. In particular, it should be noted that the present invention is subject to modification with regard to the dimensional relationships set forth herein and modifications in assembly, materials, size, shape and use.

What is claimed is:

1. A trellis system for growing vine plants, comprising:
    a plurality of plant rows, said plurality of plant rows forming at least a first plant row, an adjacent second plant row in spaced apart relation to said first plant row and a path between said first plant row and said second plant row;
    a plurality of first support members, said first support members formed in a first support row substantially aligned with said first plant row;
    a plurality of second support members, said second support members formed in a second support row substantially aligned with said second plant row;
    a first support arm attached to each of said first support members, said first support arm extending into said path;
    a second support arm attached to each of said second support members, said second support arm extending into said path;
    a first wire member interconnecting said first support arm on each of said first support members;
    a second wire member interconnecting said second support arm on each of said second support members; and
    a latch mechanism having a latch body with a first end and a second end, said latch mechanism interconnecting said first support row and said second support row.

2. The trellis system according to claim 1, wherein said latch body further comprises pivoting means for pivotally connecting said latch body to said first support row.

3. The trellis system according to claim 2, wherein said first end of said latch body is pivotally attached to said first support arm.

4. The trellis system according to claim 2, wherein said pivoting means comprises an opening in said latch body, said opening connected to an outer edge of said latch body for insertion of said first wire member into said opening, said opening sized and configured to allow said latch body to pivot around said first wire member.

5. The trellis system according to claim 1, wherein said second end of said latch body comprises latch attachment means for attaching said second end of said latch body to said second support arm.

6. The trellis system according to claim 5, wherein said latch attachment means comprises means for selecting the length of said body member to tightly interconnect said first support row to said second support row.

7. The trellis system according to claim 6, wherein said selecting means comprises one or more slots in said latch body at said second end of said latch body.

8. The trellis system according to claim 7, wherein said one or more slots in said latch body are sized and configured to prevent said latch mechanism from accidently releasing from said second support arm.

9. The trellis system according to claim 7, wherein said one or more slots in said latch body are sized and configured to prevent said latch mechanism from accidently releasing from said second wire member.

10. A trellis system for growing vine plants, comprising:
    a plurality of plant rows, said plurality of plant rows forming at least a first plant row, an adjacent second plant row in spaced apart relation to said first plant row and a path between said first plant row and said second plant row;
    a plurality of first support members, said first support members formed in a first support row substantially aligned with said first plant row;
    a plurality of second support members, said second support members formed in a second support row substantially aligned with said second plant row;

a first support arm attached to each of said first support members, said first support arm extending into said path;

a second support arm attached to each of said second support members, said second support arm extending into said path;

a first wire member interconnecting said first support arm on each of said first support members;

a second wire member interconnecting said second support arm on each of said second support members; and a latch mechanism having a latch body with a first end and a second end, said first end of said latch body comprising pivoting means for pivotally connecting said first end to said first support row, said second end of said latch body comprising latch attachment means for attaching said second end to said second support row.

11. The trellis system according to claim 10, wherein said pivoting means attaches said first end of said latch body to said first support arm.

12. The trellis system according to claim 10, wherein said pivoting means comprises an opening in said latch body, said opening connected to an outer edge of said latch body for insertion of said first wire member into said opening, said opening sized and configured to allow said latch body to pivot around said first wire member.

13. The trellis system according to claim 10, wherein said latch attachment means comprises means for selecting the length of said body member to tightly interconnect said first support row to said second support row.

14. The trellis system according to claim 13, wherein said selecting means comprises one or more slots in said latch body at said second end of said latch body.

15. The trellis system according to claim 14, wherein said one or more slots in said latch body are sized and configured to prevent said latch mechanism from accidently releasing from said second support row.

16. A latch mechanism in combination with a trellis system for growing vine plants in a plurality of plant rows, wherein said trellis system has a first row of support members with a plurality of support arms interconnected by a first wire member and a second row of support members adjacent and in spaced apart relation to said first row of support members, said second row of support members having a plurality of support arms interconnected by a second wire member, said latch mechanism comprising:

a latch body having a first end and an opposing second end;

pivoting means at said first end of said latch body for pivotally attaching said latch body to said first row of support members; and latch attachment means at said second end of said latch body for attaching said latch body to said second row of support members.

17. The latch mechanism according to claim 16, wherein said pivoting means attaches said first end of said latch body to one of said support arms.

18. The latch mechanism according to claim 16, wherein said pivoting means comprises an opening in said latch body, said opening connected to an outer edge of said latch body for insertion of said first wire member into said opening, said opening sized and configured to allow said latch body to pivot around said first wire member.

19. The latch mechanism according to claim 16, wherein said latch attachment means comprises means for selecting the length of said body member to tightly interconnect said first row of support members to said second row of support members.

20. The latch mechanism according to claim 19, wherein said selecting means comprises one or more slots in said latch body at said second end of said latch body, said one or more slots in said latch body sized and configured to prevent said latch mechanism from accidently releasing from said second row of support members.

\* \* \* \* \*